(12) United States Patent
Hughes et al.

(10) Patent No.: US 10,303,606 B2
(45) Date of Patent: *May 28, 2019

(54) DYNAMIC HOME TILE MAPPING

(71) Applicant: Intel Corporation, Santa Clara, CA (US)

(72) Inventors: Christopher J. Hughes, Santa Clara, CA (US); Daehyun Kim, San Jose, CA (US); Jong Soo Park, Santa Clara, CA (US); Richard M. Yoo, Standford, CA (US)

(73) Assignee: Intel Corporation, Santa Clara, CA (US)

( * ) Notice: Subject to any disclaimer, the term of this patent is extended or adjusted under 35 U.S.C. 154(b) by 98 days.

This patent is subject to a terminal disclaimer.

(21) Appl. No.: 15/465,097

(22) Filed: Mar. 21, 2017

(65) Prior Publication Data

US 2017/0192891 A1    Jul. 6, 2017

Related U.S. Application Data

(63) Continuation of application No. 13/922,072, filed on Jun. 19, 2013, now Pat. No. 9,645,930.

(51) Int. Cl.
    *G06F 12/0813*    (2016.01)
    *G06F 12/0817*    (2016.01)
    *G06F 12/0831*    (2016.01)

(52) U.S. Cl.
    CPC ...... *G06F 12/0831* (2013.01); *G06F 12/0813* (2013.01); *G06F 12/0817* (2013.01); *G06F 2212/621* (2013.01); *Y02D 10/13* (2018.01)

(58) Field of Classification Search
    CPC ............. G06F 12/0831; G06F 12/0813; G06F 12/0817; G06F 2212/621; Y02D 10/01
    See application file for complete search history.

(56) References Cited

U.S. PATENT DOCUMENTS

| 5,893,922 A | 4/1999 | Baylor et al. |
|---|---|---|
| 6,594,733 B1 | 7/2003 | Cardente |
| 7,805,575 B1 | 9/2010 | Agarwal et al. |
| 7,975,109 B2 | 7/2011 | McWilliams et al. |

(Continued)

OTHER PUBLICATIONS

Mieszko Lis, Keun Sup Shim, Myong Hyon Cho, Omer Khan, Srinivas Devadas "Directoryless Shared Memory Coherence Using Execution Migration" 2011, Massachusetts Institute of Technology (Year: 2011).*

(Continued)

*Primary Examiner* — Rocio Del Mar Perez-Velez
(74) *Attorney, Agent, or Firm* — Lowenstein Sandler LLP

(57) ABSTRACT

Technologies for migration of dynamic home tile mapping are described. A cache controller can receive coherence messages from other processor cores on the die. The cache controller records locations from which the coherence messages originate and determine distances between the requested home tiles and the locations from which the coherence messages originate. The cache controller determines whether an average distance between a particular home tile, whose identifier is stored in the home tile table, exceeds a threshold. When the average distance exceeds the defined threshold, the cache controller migrates the particular home tile to another location.

20 Claims, 10 Drawing Sheets

(56) References Cited

U.S. PATENT DOCUMENTS

| | | | |
|---|---|---|---|
| 8,539,155 B1* | 9/2013 | Miao | G06F 12/1027 |
| | | | 711/121 |
| 9,298,621 B2* | 3/2016 | Li | G06F 12/0813 |
| 2004/0034747 A1 | 2/2004 | Rowlands et al. | |
| 2006/0112228 A1* | 5/2006 | Shen | G06F 12/084 |
| | | | 711/133 |
| 2006/0143384 A1* | 6/2006 | Hughes | G06F 12/0833 |
| | | | 711/130 |
| 2007/0156964 A1* | 7/2007 | Sistla | G06F 12/121 |
| | | | 711/133 |
| 2010/0274973 A1* | 10/2010 | Balakrishnan | G06F 12/0811 |
| | | | 711/130 |
| 2011/0225298 A1* | 9/2011 | Brown | G06F 9/505 |
| | | | 709/226 |
| 2014/0143781 A1* | 5/2014 | Yao | G06F 9/5038 |
| | | | 718/100 |

OTHER PUBLICATIONS

Mohammad Hammoud, Sangyeun Cho, Rami Melhem ACM: An Efficient Approach for Managing Shared Caches in Chip Multiprocessors, 2009 (Year: 2009).*

European Search Report dated Sep. 24, 2014 on application No. 14170481.7-1953.

* cited by examiner

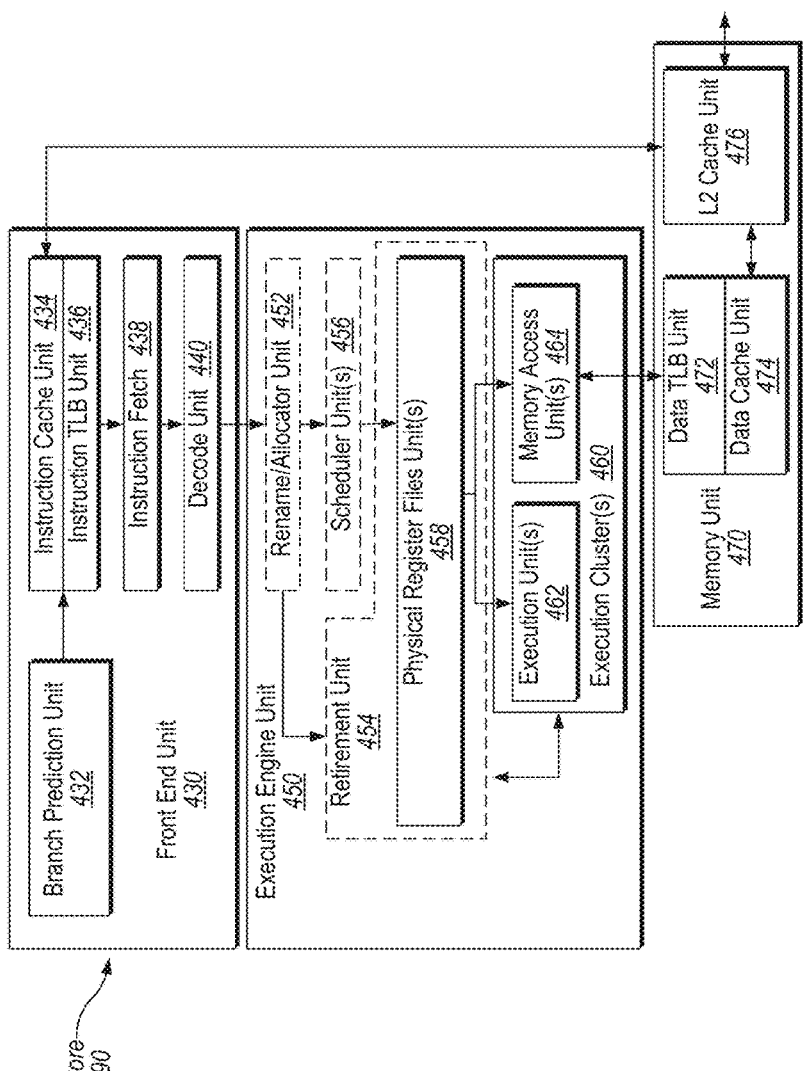

DYNAMIC HOME TILE MAPPING

RELATED APPLICATIONS

This application is a continuation of U.S. application Ser. No. 13/922,072, filed Jun. 19, 2013, the entire contents of which are incorporated by reference herein.

TECHNICAL FIELD

Embodiments described herein generally relate to processing devices and, more specifically, relate to dynamic home tile mapping.

BACKGROUND

Many microprocessors use directory-based coherence to maintain cache coherence within a die. Scalable directory organizations can distribute slices, or subsets, of the directory across the chip. Accordingly, for a given shared data access requiring coherence actions, the distance between the cores involved and the corresponding directory slice can affect the latency of the core-to-core communication and the energy dissipated in the on-chip interconnect.

BRIEF DESCRIPTION OF THE DRAWINGS

FIG. 1D illustrates elements of a processor micro-architecture according to one embodiment.

FIG. 1E illustrates elements of a processor micro-architecture according to one embodiment.

DESCRIPTION OF EMBODIMENTS

Figure 1A:
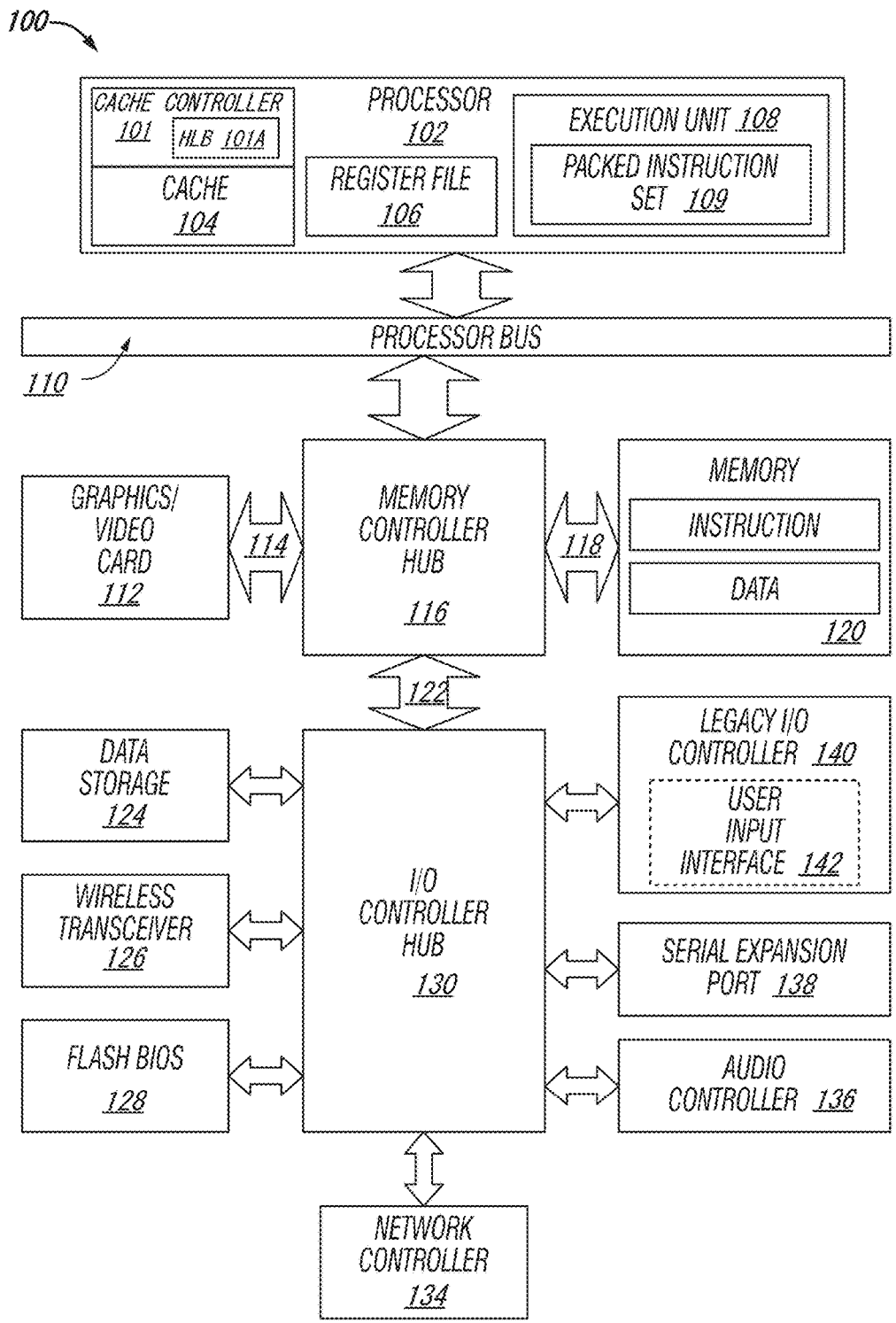
FIG. 1A is a block diagram of one embodiment of a system for dynamic home tile mapping.

Various microprocessors use directory-based coherence to maintain cache coherence, such as within a die. Scalable directory organizations can distribute slices of such a directory and/or subsets thereof, across the chip (e.g., across multiple cores). Accordingly, for a given shared data access requiring coherence actions, the distance between the cores involved and the corresponding directory slice can affect the latency of the core-to-core communication and/or the energy dissipated in the on-chip interconnect.

While various mechanisms (e.g., hierarchical cache organizations, non-uniform cache architecture, and/or thread affinity) attempt to place data close to those core(s) that access it, the referenced directory information is placed randomly and thus can become a bottleneck, especially as the number of cores on a die scales.

Specifically, various directory designs are operative to statically map a cache line to a directory slice that maintains the corresponding sharing information (reflecting, for example, whether the information is/is not currently being used/accessed) using a 'home tile.' Such a home tile can be computed, for example, by applying a hash function to the address (e.g., the physical address) of a cache line. When a core requests/needs to consult sharing information, it can first compute the corresponding hash function and then send one or more coherence messages in relation to the computed home tile. Although mapping home tiles through such hash functions can avoid 'worst case' behaviors (by randomizing the placement of sharing information), such an approach does not leverage locality with respect to a set of consecutive directory accesses.

Hierarchical directory organizations partially address the locality of directory information, but with their own limitations. Having more directory levels increases the number of directory lookups, which in turn increases the latency and energy consumption. In addition, while the hierarchical directory organizations are directed to reducing space requirements for tracking sharers, other approaches such as Cuckoo directory can be more space efficient (and various techniques described herein can also be compatible with such approaches).

It should be understood that while several of the referenced approaches are directed to the placement and migration of data within on-die caches (e.g., non-uniform cache architecture or 'NUCA'), various implementations described herein are directed towards the directory information, such as in scenarios where the directory is a separate structure from the cache(s).

Accordingly, described herein in various implementations are technologies that improve the locality of directory information access. In certain implementations, this can be achieved by enabling the dynamic changing of the mapping from a piece of data to its home tile. In certain implementations, such mapping information can be maintained, and an improved home tile location (over a random home tile location, for example) can be computed for one or more pieces of data. The home tile can then be migrated (e.g., when appropriate). In addition, an API can be provided, which can, for example, enable the home tile to be specified by a user.

It should be understood that implementing the technologies described herein can serve to improve the locality of directory information access, thereby allowing processors to provide improved scalability and energy efficiency as the number of cores grows.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice embodiments of the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present disclosure.

Although the following embodiments may be described with reference to dynamic home tile mapping in computing platforms or microprocessors, other embodiments are applicable to other types of integrated circuits and logic devices. Similar techniques and teachings of embodiments described herein may be applied to other types of circuits or semiconductor devices that may also benefit from implementing a line state tracker. For example, the disclosed embodiments are not limited to desktop computer systems or Ultrabooks™ and may be also used in other devices, such as handheld devices, tablets, other thin notebooks, systems on a chip (SOC) devices, and embedded applications. Some examples of handheld devices include cellular phones ('smartphones'), Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency.

Although the following embodiments are described with reference to a processor, other embodiments are applicable to other types of integrated circuits and logic devices. Similar techniques and teachings of embodiments of the present disclosure can be applied to other types of circuits or semiconductor devices that can benefit from higher pipeline throughput and improved performance. The teachings of embodiments of the present disclosure are applicable to any processor or machine that performs data manipulations. However, the present disclosure is not limited to processors or machines that perform 512 bit, 256 bit, 128 bit, 64 bit, 32 bit, or 16 bit data operations and can be applied to any processor and machine in which manipulation or management of data is performed. In addition, the following description provides examples, and the accompanying drawings show various examples for the purposes of illustration. However, these examples should not be construed in a limiting sense as they are merely intended to provide examples of embodiments of the present disclosure rather than to provide an exhaustive list of all possible implementations or embodiments of the present disclosure.

Although the below examples describe instruction handling and distribution in the context of execution units and logic circuits, other embodiments of the present disclosure can be accomplished by way of a data or instructions stored on a machine-readable, tangible medium, which when performed by a machine cause the machine to perform functions consistent with at least one embodiment of the invention. In one embodiment, functions associated with embodiments of the present disclosure are embodied in machine-executable instructions. The instructions can be used to cause a general-purpose or special-purpose processor that is programmed with the instructions to perform the operations of the present disclosure. Embodiments of the present disclosure may be provided as a computer program product or software which may include a machine or computer-readable medium having stored thereon instructions which may be used to program a computer (or other electronic devices) to perform one or more operations according to embodiments of the present disclosure. Alternatively, operations of embodiments of the present disclosure might be performed by specific hardware components that contain fixed-function logic for performing the operations, or by any combination of programmed computer components and fixed-function hardware components.

Instructions used to program logic to perform embodiments of the disclosed technologies can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

In modern processors, a number of different execution units are used to process and execute a variety of code and instructions. Not all instructions are created equal as some are quicker to complete while others can take a number of clock cycles to complete. The faster the throughput of instructions, the better the overall performance of the processor. Thus it would be advantageous to have as many instructions execute as fast as possible. However, there are certain instructions that have greater complexity and require more in terms of execution time and processor resources. For example, there are floating point instructions, load/store operations, data moves, etc.

As more computer systems are used in Internet, text, and multimedia applications, additional processor support has been introduced over time. In one embodiment, an instruction set may be associated with one or more computer architectures, including data types, instructions, register architecture, addressing modes, memory architecture, interrupt and exception handling, and external input and output (I/O).

In one embodiment, the instruction set architecture (ISA) may be implemented by one or more micro-architectures, which includes processor logic and circuits used to implement one or more instruction sets. Accordingly, processors with different micro-architectures can share at least a portion of a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. Similarly, processors designed by other processor development companies, such as ARM Holdings, Ltd., MIPS, or their licensees or adopters, may share at least a portion a common instruction set, but may include different processor designs. For example, the same register architecture of the ISA may be implemented in different ways in different micro-architectures using new or well-known techniques, including dedicated physical registers, one or more dynamically allocated physical registers using a register renaming mechanism (e.g., the use of a Register Alias Table (RAT), a Reorder Buffer (ROB) and a retirement register file. In one embodiment, registers may include one or more registers, register architectures, register files, or other register sets that may or may not be addressable by a software programmer.

In one embodiment, an instruction may include one or more instruction formats. In one embodiment, an instruction format may indicate various fields (number of bits, location of bits, etc.) to specify, among other things, the operation to be performed and the operand(s) on which that operation is to be performed. Some instruction formats may be further broken defined by instruction templates (or sub formats). For example, the instruction templates of a given instruction format may be defined to have different subsets of the instruction format's fields and/or defined to have a given field interpreted differently. In one embodiment, an instruction is expressed using an instruction format (and, if defined, in a given one of the instruction templates of that instruction format) and specifies or indicates the operation and the operands upon which the operation will operate.

Scientific, financial, auto-vectorized general purpose, RMS (recognition, mining, and synthesis), and visual and multimedia applications (e.g., 2D/3D graphics, image processing, video compression/decompression, voice recognition algorithms and audio manipulation) may require the same operation to be performed on a large number of data items. In one embodiment, Single Instruction Multiple Data (SIMD) refers to a type of instruction that causes a processor to perform an operation on multiple data elements. SIMD technology may be used in processors that can logically divide the bits in a register into a number of fixed-sized or variable-sized data elements, each of which represents a separate value. For example, in one embodiment, the bits in a 64-bit register may be organized as a source operand containing four separate 16-bit data elements, each of which represents a separate 16-bit value. This type of data may be referred to as 'packed' data type or 'vector' data type, and operands of this data type are referred to as packed data operands or vector operands. In one embodiment, a packed data item or vector may be a sequence of packed data elements stored within a single register, and a packed data operand or a vector operand may a source or destination operand of a SIMD instruction (or 'packed data instruction' or a 'vector instruction'). In one embodiment, a SIMD instruction specifies a single vector operation to be performed on two source vector operands to generate a destination vector operand (also referred to as a result vector operand) of the same or different size, with the same or different number of data elements, and in the same or different data element order.

SIMD technology, such as that employed by the Intel® Core™ processors having an instruction set including x86, MMX™, Streaming SIMD Extensions (SSE), SSE2, SSE3, SSE4.1, and SSE4.2 instructions, ARM processors, such as the ARM Cortex® family of processors having an instruction set including the Vector Floating Point (VFP) and/or NEON instructions, and MIPS processors, such as the Loongson family of processors developed by the Institute of Computing Technology (ICT) of the Chinese Academy of Sciences, has enabled a significant improvement in application performance (Core™ and MMX™ are registered trademarks or trademarks of Intel Corporation of Santa Clara, Calif.).

In one embodiment, destination and source registers/data are generic terms to represent the source and destination of the corresponding data or operation. In some embodiments, they may be implemented by registers, memory, or other storage areas having other names or functions than those depicted. For example, in one embodiment, "DEST1" may be a temporary storage register or other storage area, whereas "SRC1" and "SRC2" may be a first and second source storage register or other storage area, and so forth. In other embodiments, two or more of the SRC and DEST storage areas may correspond to different data storage elements within the same storage area (e.g., a SIMD register). In one embodiment, one of the source registers may also act as a destination register by, for example, writing back the result of an operation performed on the first and second source data to one of the two source registers serving as a destination registers.

Turning to FIG. 1A, a block diagram of an exemplary computer system formed with a processor that includes execution units to execute an instruction, where one or more of the interconnects implement one or more features in accordance with one embodiment of the present disclosure is illustrated. System 100 includes a component, such as a processor 102 to employ execution units including logic to perform algorithms for process data, in accordance with the present disclosure, such as in the embodiment described herein. System 100 is representative of processing systems based on the PENTIUM III™, PENTIUM 4™, Xeon™, Itanium, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 100 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present disclosure are not limited to any specific combination of hardware circuitry and software.

Embodiments are not limited to computer systems. Alternative embodiments of the present disclosure can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In this illustrated embodiment, processor 102 includes one or more execution units 108 to implement an algorithm that is to perform at least one instruction. One embodiment may be described in the context of a single processor desktop or server system, but alternative embodiments may be included in a multiprocessor system. System 100 is an example of a 'hub' system architecture. The computer system 100 includes a processor 102 to process data signals. The processor 102, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 102 is coupled to a processor bus 110 that transmits data signals between the processor 102 and other components in the system 100. The elements of system 100 (e.g. graphics accelerator 112, memory controller hub 116, memory 120, I/O controller hub 124, wireless transceiver 126, Flash BIOS 128, Network controller 134, Audio controller 136, Serial expansion port 138, I/O controller 140, etc.) perform their conventional functions that are well known to those familiar with the art.

In one embodiment, the processor 102 includes a Level 1 (L1) internal cache memory 104. Depending on the architecture, the processor 102 may have a single internal cache or multiple levels of internal caches. Processor 102 also includes cache controller 101 coupled to cache 104. Cache controller 101 can control various operations performed by and/or in relation to cache 104. In certain implementations, cache controller 101 can include home-tile lookaside buffer (HLB) 101A. HLB 101A can include instructions and/or logic that can enable dynamic home tile mapping. Other embodiments include a combination of both internal and external caches depending on the particular implementation and needs. Register file 106 is to store different types of data in various registers including integer registers, floating point registers, vector registers, banked registers, shadow registers, checkpoint registers, status registers, and instruction pointer register.

Execution unit 108, including logic to perform integer and floating point operations, also resides in the processor 102. The processor 102, in one embodiment, includes a microcode (ucode) ROM to store microcode, which when executed, is to perform algorithms for certain macroinstructions or handle complex scenarios. Here, microcode is potentially updateable to handle logic bugs/fixes for processor 102. For one embodiment, execution unit 108 includes logic to handle a packed instruction set 109. By including the packed instruction set 109 in the instruction set of a general-purpose processor 102, along with associated circuitry to execute the instructions, the operations used by many multimedia applications may be performed using packed data in a general-purpose processor 102. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

Alternate embodiments of an execution unit 108 may also be used in micro controllers, embedded processors, graphics devices, DSPs, and other types of logic circuits. System 100 includes a memory 120. Memory 120 includes a dynamic random access memory (DRAM) device, a static random access memory (SRAM) device, flash memory device, or other memory device. Memory 120 stores instructions and/or data represented by data signals that are to be executed by the processor 102.

A system logic chip 116 is coupled to the processor bus 110 and memory 120. The system logic chip 116 in the illustrated embodiment is a memory controller hub (MCH). The processor 102 can communicate to the MCH 116 via a processor bus 110. The MCH 116 provides a high bandwidth memory path 118 to memory 120 for instruction and data storage and for storage of graphics commands, data and textures. The MCH 116 is to direct data signals between the processor 102, memory 120, and other components in the system 100 and to bridge the data signals between processor bus 110, memory 120, and system I/O 122. In some embodiments, the system logic chip 116 can provide a graphics port for coupling to a graphics controller 112. The MCH 116 is coupled to memory 120 through a memory interface 118. The graphics card 112 is coupled to the MCH 116 through an Accelerated Graphics Port (AGP) interconnect 114.

System 100 uses a proprietary hub interface bus 122 to couple the MCH 116 to the I/O controller hub (ICH) 130. The ICH 130 provides direct connections to some I/O devices via a local I/O bus. The local I/O bus is a high-speed I/O bus for connecting peripherals to the memory 120, chipset, and processor 102. Some examples are the audio controller, firmware hub (flash BIOS) 128, wireless transceiver 126, data storage 124, legacy I/O controller containing user input and keyboard interfaces, a serial expansion port such as Universal Serial Bus (USB), and a network controller 134. The data storage device 124 can comprise a hard disk drive, a floppy disk drive, a CD-ROM device, a flash memory device, or other mass storage device.

For another embodiment of a system, an instruction in accordance with one embodiment can be used with a system on a chip. One embodiment of a system on a chip comprises of a processor and a memory. The memory for one such system is a flash memory. The flash memory can be located on the same die as the processor and other system components. Additionally, other logic blocks such as a memory controller or graphics controller can also be located on a system on a chip.

Figure 1B:
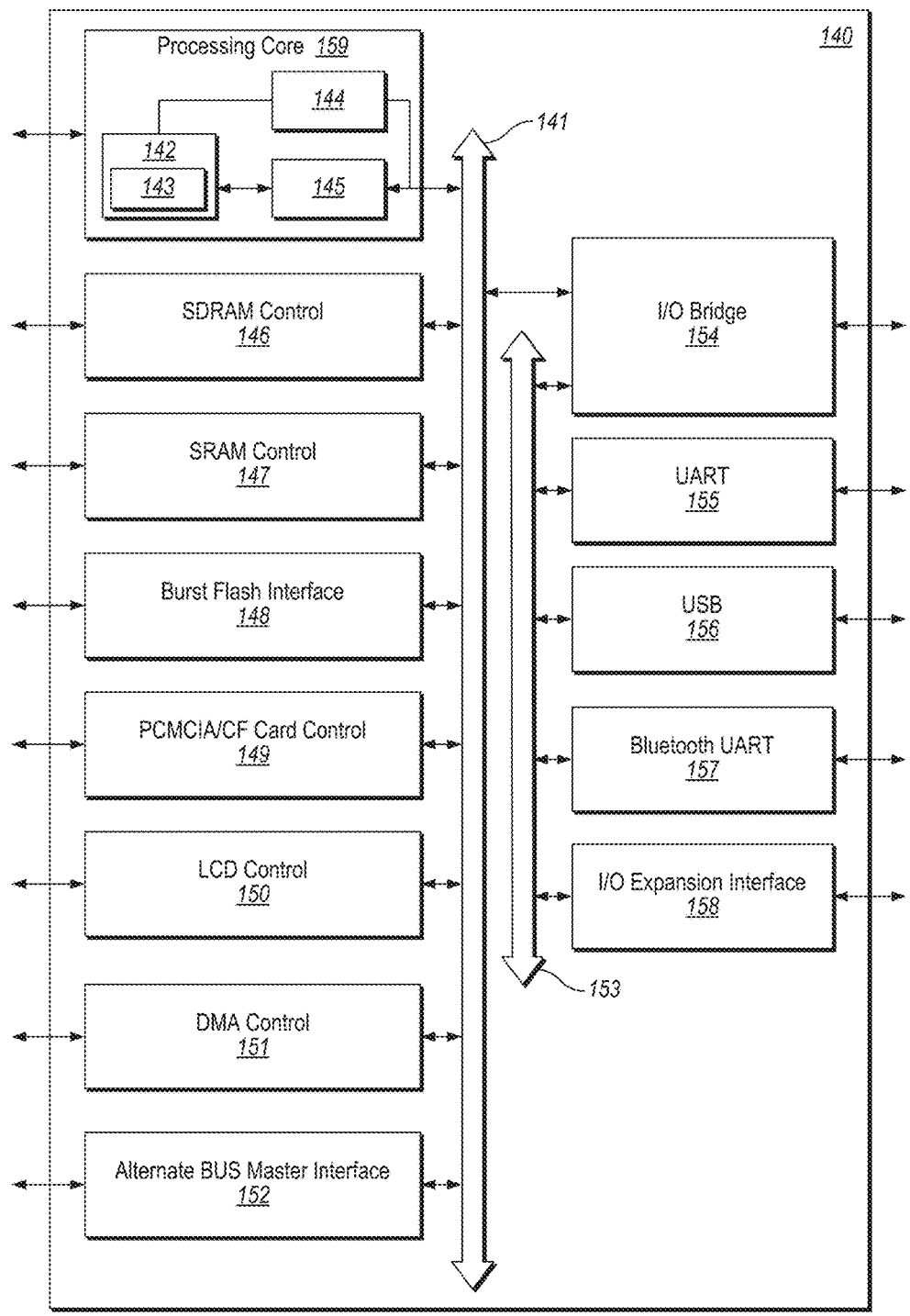
FIG. 1B is a block diagram of one embodiment of a system for dynamic home tile mapping.

FIG. 1B illustrates a data processing system 140 which implements the principles of one embodiment of the present disclosure. It will be readily appreciated by one of skill in the art that the embodiments described herein can be used with alternative processing systems without departure from the scope of embodiments of the disclosure.

Computer system 140 comprises a processing core 159 capable of dynamic home tile mapping. For one embodiment, processing core 159 represents a processing unit of any type of architecture, including but not limited to a CISC, a RISC or a VLIW type architecture. Processing core 159 may also be suitable for manufacture in one or more process technologies and by being represented on a machine readable media in sufficient detail, may be suitable to facilitate said manufacture.

Processing core 159 comprises an execution unit 142, a set of register file(s) 145, and a decoder 144. Processing core 159 also includes additional circuitry (not shown) which is not necessary to the understanding of embodiments of the present disclosure. Execution unit 142 is used for executing instructions received by processing core 159. In addition to performing typical processor instructions, execution unit 142 can perform instructions in packed instruction set 143 for performing operations on packed data formats. Packed instruction set 143 includes instructions for performing embodiments of the disclosed technologies and other packed instructions. Execution unit 142 is coupled to register file 145 by an internal bus. Register file 145 represents a storage area on processing core 159 for storing information, including data. As previously mentioned, it is understood that the storage area used for storing the packed data is not critical. Execution unit 142 is coupled to decoder 144. Decoder 144 is used for decoding instructions received by processing core 159 into control signals and/or microcode entry points. In response to these control signals and/or microcode entry points, execution unit 142 performs the appropriate operations. In one embodiment, the decoder is used to interpret the opcode of the instruction, which will indicate what operation should be performed on the corresponding data indicated within the instruction.

Processing core 159 is coupled with bus 141 for communicating with various other system devices, which may include but are not limited to, for example, synchronous dynamic random access memory (SDRAM) control 146, static random access memory (SRAM) control 147, burst flash memory interface 148, personal computer memory card international association (PCMCIA)/compact flash (CF) card control 149, liquid crystal display (LCD) control 150, direct memory access (DMA) controller 151, and alternative bus master interface 152. In one embodiment, data processing system 140 may also comprise an I/O bridge 154 for communicating with various I/O devices via an I/O bus 153. Such I/O devices may include but are not limited to, for example, universal asynchronous receiver/transmitter (UART) 155, universal serial bus (USB) 156, Bluetooth wireless UART 157 and I/O expansion interface 158.

One embodiment of data processing system 140 provides for mobile, network and/or wireless communications and a processing core 159 capable of performing SIMD operations including a text string comparison operation. Processing core 159 may be programmed with various audio, video, imaging and communications algorithms including discrete transformations such as a Walsh-Hadamard transform, a fast Fourier transform (FFT), a discrete cosine transform (DCT), and their respective inverse transforms; compression/decompression techniques such as color space transformation, video encode motion estimation or video decode motion compensation; and modulation/demodulation (MODEM) functions such as pulse coded modulation (PCM).

Figure 1C:
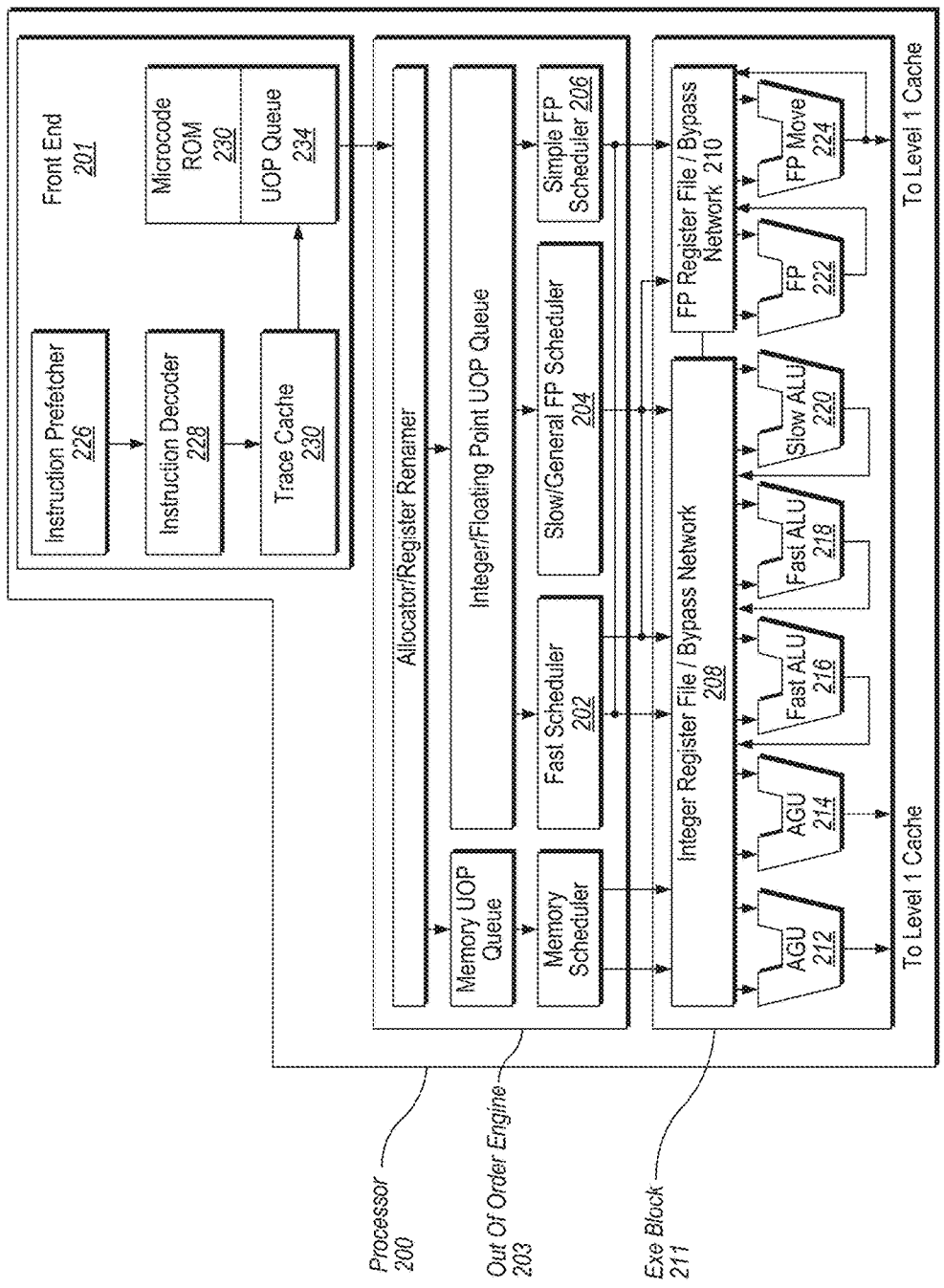
FIG. 1C is a block diagram of a processor according to one embodiment.

FIG. 1C illustrates a block diagram of the micro-architecture for a processor 200 that includes logic circuits for dynamic home tile mapping in accordance with one embodiment of the present disclosure. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 201 is the part of the processor 200 that fetches instructions to be executed and prepares them to be used later in the processor pipeline. The front end 201 may include several units. In one embodiment, the instruction prefetcher 226 fetches instructions from memory and feeds them to an instruction decoder 228 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 230 takes decoded uops and assembles them into program ordered sequences or traces in the uop queue 234 for execution. When the trace cache 230 encounters a complex instruction, the microcode ROM 232 provides the uops needed to complete the operation.

Some instructions are converted into a single micro-op, whereas others need several micro-ops to complete the full operation. In one embodiment, if more than four micro-ops are needed to complete an instruction, the decoder 228 accesses the microcode ROM 232 to do the instruction. For one embodiment, an instruction can be decoded into a small number of micro ops for processing at the instruction decoder 228. In another embodiment, an instruction can be stored within the microcode ROM 232 should a number of micro-ops be needed to accomplish the operation. The trace cache 230 refers to an entry point programmable logic array (PLA) to determine a correct micro-instruction pointer for reading the micro-code sequences to complete one or more instructions in accordance with one embodiment from the micro-code ROM 232. After the microcode ROM 232 finishes sequencing micro-ops for an instruction, the front end 201 of the machine resumes fetching micro-ops from the trace cache 230.

The out-of-order execution engine 203 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 202, slow/general floating point scheduler 204, and simple floating point scheduler 206. The uop schedulers 202, 204, 206, determine when a uop is ready to execute based on the readiness of their dependent input register operand sources and the availability of the execution resources the uops need to complete their operation. The fast scheduler 202 of one embodiment can schedule on each half of the main clock cycle while the other schedulers can only schedule once per main processor clock cycle. The schedulers arbitrate for the dispatch ports to schedule uops for execution.

Register files 208, 210, sit between the schedulers 202, 204, 206, and the execution units 212, 214, 216, 218, 220, 222, 224 in the execution block 211. There is a separate register file 208, 210, for integer and floating point operations, respectively. Each register file 208, 210, of one embodiment also includes a bypass network that can bypass or forward just completed results that have not yet been written into the register file to new dependent uops. The integer register file 208 and the floating point register file 210 are also capable of communicating data with the other. For one embodiment, the integer register file 208 is split into two separate register files, one register file for the low order 32 bits of data and a second register file for the high order 32 bits of data. The floating point register file 210 of one embodiment has 128 bit wide entries because floating point instructions typically have operands from 64 to 128 bits in width.

The execution block 211 contains the execution units 212, 214, 216, 218, 220, 222, 224, where the instructions are actually executed. This section includes the register files 208, 210, that store the integer and floating point data operand values that the micro-instructions need to execute. The processor 200 of one embodiment is comprised of a number of execution units: address generation unit (AGU) 212, AGU 214, fast ALU 216, fast ALU 218, slow ALU 220, floating point ALU 222, floating point move unit 224. For one embodiment, the floating point execution blocks 222, 224, execute floating point, MMX, SIMD, and SSE, or other operations. The floating point ALU 222 of one embodiment includes a 64 bit by 64 bit floating point divider to execute divide, square root, and remainder micro-ops. For embodiments of the present disclosure, instructions involving a floating point value may be handled with the floating point hardware. In one embodiment, the ALU operations go to the high-speed ALU execution units 216, 218. The fast ALUs 216, 218, of one embodiment can execute fast operations with an effective latency of half a clock cycle. For one embodiment, most complex integer operations go to the slow ALU 220 as the slow ALU 220 includes integer execution hardware for long latency type of operations, such as a multiplier, shifts, flag logic, and branch processing. Memory load/store operations are executed by the AGUs 212, 214. For one embodiment, the integer ALUs 216, 218, 220, are described in the context of performing integer operations on 64 bit data operands. In alternative embodiments, the ALUs 216, 218, 220, can be implemented to support a variety of data bits including 16, 32, 128, 256, etc. Similarly, the floating point units 222, 224, can be implemented to support a range of operands having bits of various widths. For one embodiment, the floating point units 222, 224, can operate on 128 bits wide packed data operands in conjunction with SIMD and multimedia instructions.

In one embodiment, the uops schedulers 202, 204, 206, dispatch dependent operations before the parent load has finished executing. As uops are speculatively scheduled and executed in processor 200, the processor 200 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

In one embodiment, processor 200 also includes logic for dynamic home tile mapping according to embodiments of the disclosed technologies. In other embodiments, processing device 200 may include hardware circuitry for dynamic home tile mapping according to at least one embodiment.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data. For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

FIG. 1D is a block diagram illustrating an in-order pipeline and a register renaming stage, out-of-order issue/execution pipeline according to at least one embodiment of the disclosed technologies. FIG. 1E is a block diagram illustrating an in-order architecture core and a register renaming logic, out-of-order issue/execution logic to be included in a processor according to at least one embodiment of the disclosed technologies. The solid lined boxes in FIG. 1D illustrate the in-order pipeline, while the dashed lined boxes illustrates the register renaming, out-of-order issue/execution pipeline. Similarly, the solid lined boxes in FIG. 1E illustrate the in-order architecture logic, while the dashed lined boxes illustrates the register renaming logic and out-of-order issue/execution logic.

In FIG. 1D, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424.

In FIG. 1E, arrows denote a coupling between two or more units and the direction of the arrow indicates a direction of data flow between those units. FIG. 1E shows processor core 490 including a front end unit 430 coupled to an execution engine unit 450, and both are coupled to a memory unit 470.

The core 490 may be a reduced instruction set computing (RISC) core, a complex instruction set computing (CISC) core, a very long instruction word (VLIW) core, or a hybrid or alternative core type. As yet another option, the core 490 may be a special-purpose core, such as, for example, a network or communication core, compression engine, graphics core, or the like.

The front end unit 430 includes a branch prediction unit 432 coupled to an instruction cache unit 434, which is coupled to an instruction translation lookaside buffer (TLB) 436, which is coupled to an instruction fetch unit 438, which is coupled to a decode unit 440. The decode unit or decoder may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 434 is further coupled to a level 2 (L2) cache unit 476 in the memory unit 470. The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 458 is overlapped by the retirement unit 454 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.). Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 454 and the physical register file(s) unit(s) 458 are coupled to the execution cluster(s) 460. The execution cluster(s) 460 includes a set of one or more execution units 162 and a set of one or more memory access units 464. The execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. In one exemplary embodiment, the memory access units 464 may include a load unit, a store address unit, and a store data unit, each of which is coupled to the data TLB unit 472 in the memory unit 470. The L2 cache unit 476 is coupled to one or more other levels of cache and eventually to a main memory. In certain implementations, one or more of the referenced caches/cache unites (e.g., 474, 476) can include and/or be coupled to a cache controller and/or an HLB (such as those depicted in FIG. 1A), such as for dynamic home tile mapping, as described herein.

By way of example, the exemplary register renaming, out-of-order issue/execution core architecture may implement the pipeline 400 as follows: 1) the instruction fetch 438 performs the fetch and length decoding stages 402 and 404; 2) the decode unit 440 performs the decode stage 406; 3) the rename/allocator unit 452 performs the allocation stage 408 and renaming stage 410; 4) the scheduler unit(s) 456 performs the schedule stage 412; 5) the physical register file(s) unit(s) 458 and the memory unit 470 perform the register read/memory read stage 414; the execution cluster 460 perform the execute stage 416; 6) the memory unit 470 and the physical register file(s) unit(s) 458 perform the write back/memory write stage 418; 7) various units may be involved in the exception handling stage 422; and 8) the retirement unit 454 and the physical register file(s) unit(s) 458 perform the commit stage 424.

The core 490 may support one or more instructions sets (e.g., the x86 instruction set (with some extensions that have been added with newer versions); the MIPS instruction set of MIPS Technologies of Sunnyvale, Calif.; the ARM instruction set (with additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units 434/474 and a shared L2 cache unit 476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 1F:
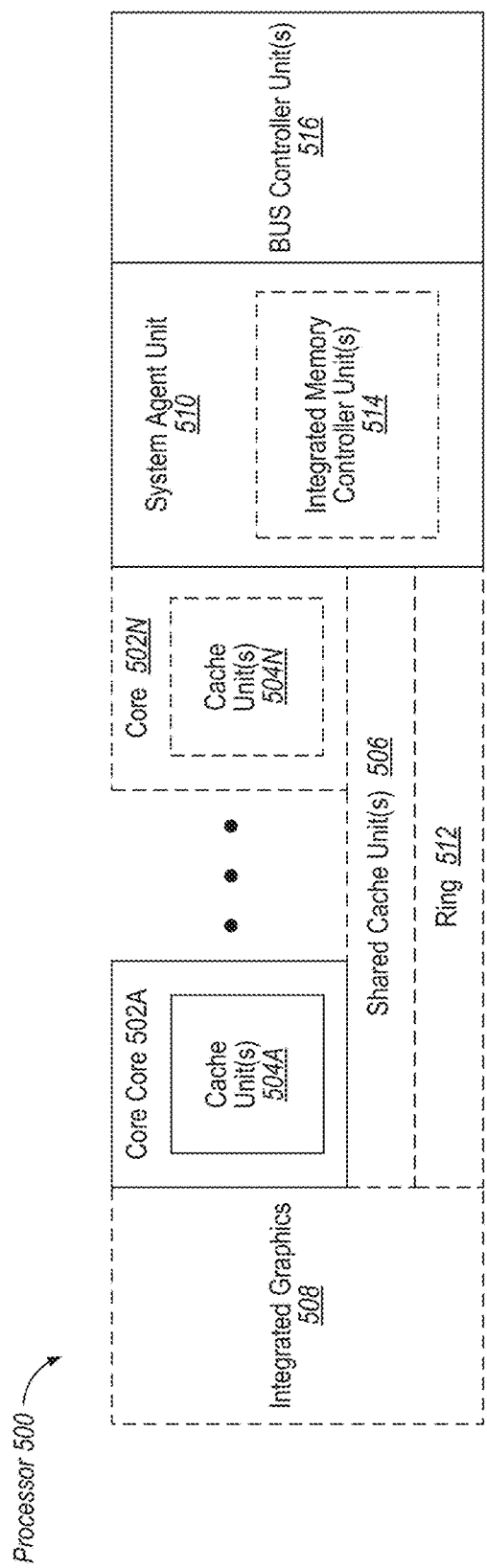
FIG. 1F is a block diagram of a processor according to one embodiment.

FIG. 1F is a block diagram of a multicore processor 500 with integrated memory controller and graphics according to embodiments of the invention. FIG. 1F illustrates a processor 500 with multiple cores 502A-N, a system agent 510, a set of one or more integrated memory controller unit(s) 514 in the system agent unit 510, a set of one or more bus controller units 516, and an integrated graphics logic 508.

The memory hierarchy includes one or more levels of cache within the cores, a set or one or more shared cache units 506, and external memory (not shown) coupled to the set of integrated memory controller units 514. The set of shared cache units 506 may include one or more mid-level caches, such as level 2 (L2), level 3 (L3), level 4 (L4), or other levels of cache, a last level cache (LLC), and/or combinations thereof. While in one embodiment a ring based interconnect unit 512 interconnects the integrated graphics logic 508, the set of shared cache units 506, and the system agent unit 510, alternative embodiments may use any number of well-known techniques for interconnecting such units.

In some embodiments, one or more of the cores 502A-N are capable of multithreading.

The system agent 510 includes those components coordinating and operating cores 502A-N. The system agent unit 510 may include for example a power control unit (PCU) and a display unit. The PCU may be or include logic and components needed for regulating the power state of the cores 502A-N and the integrated graphics logic 508. The display unit is for driving one or more externally connected displays.

The cores 502A-N may be homogenous or heterogeneous in terms of architecture and/or instruction set. For example, some of the cores 502A-N may be in order while others are out-of-order. As another example, two or more of the cores 502A-N may be capable of execution the same instruction set, while others may be capable of executing only a subset of that instruction set or a different instruction set. Moreover, each core can contain a respective home-tile lookaside buffer (HLB) 260A-N, as described herein.

The processor may be a general-purpose processor, such as a Core™ i3, i5, i7, 2 Duo and Quad, Xeon™, Itanium™, XScale™ or StrongARM™ processor, which are available from Intel Corporation, of Santa Clara, Calif. Alternatively, the processor may be from another company, such as ARM Holdings, Ltd, MIPS, etc. The processor may be a special-purpose processor, such as, for example, a network or communication processor, compression engine, graphics processor, co-processor, embedded processor, or the like. The processor may be implemented on one or more chips. The processor 500 may be a part of and/or may be implemented on one or more substrates using any of a number of process technologies, such as, for example, BiCMOS, CMOS, or NMOS.

Figure 2:
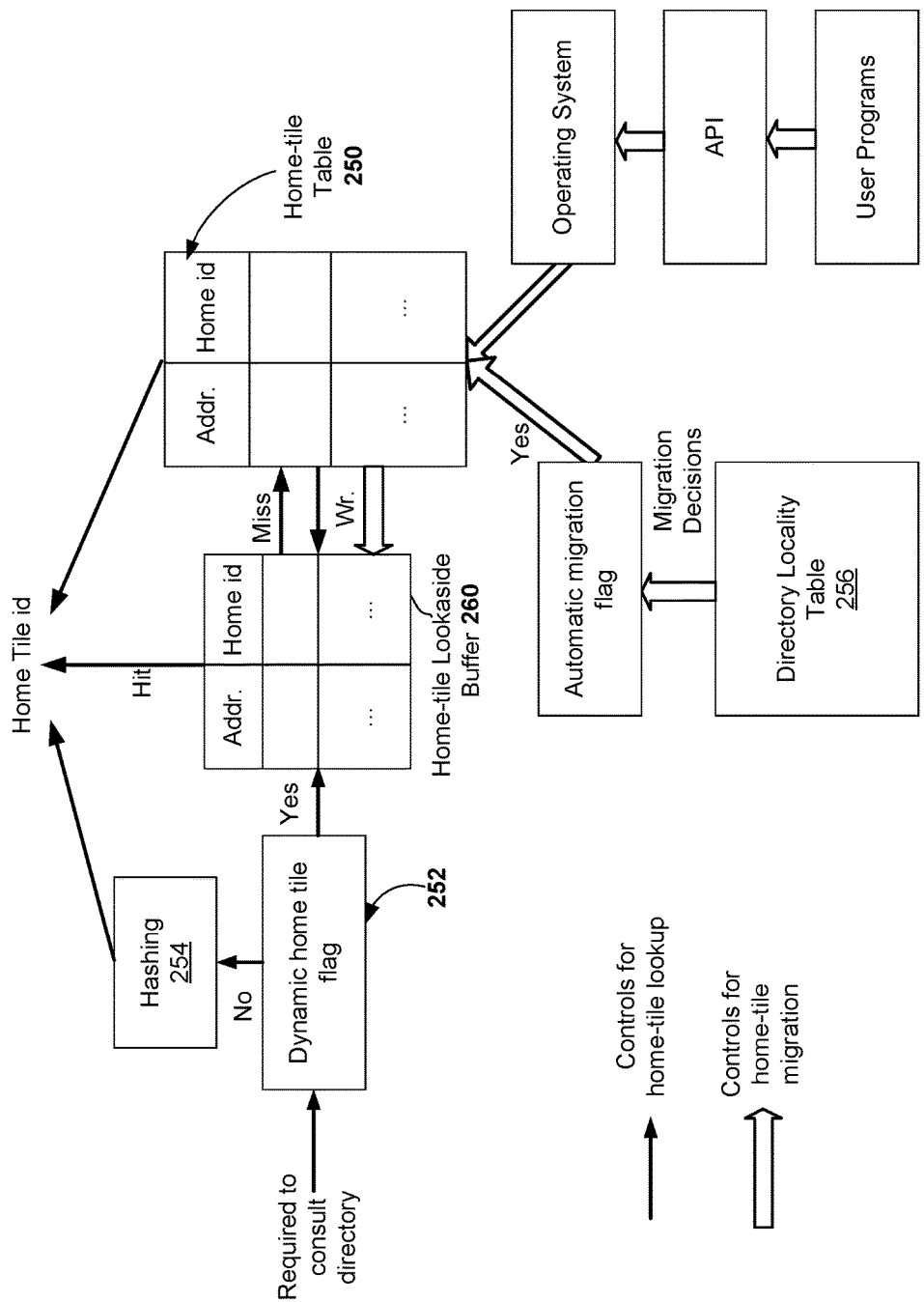
FIG. 2 is a block diagram of one embodiment of a cache controller/home-tile lookaside buffer (HLB).

Turning to FIG. 2, a block diagram of an exemplary cache controller/home-tile lookaside buffer (HLB) that implements one or more features in accordance with one embodiment of the present disclosure is illustrated. The illustrated technologies pertain to the implementation of a cache controller (having, in certain implementations, an HLB) that can enable dynamic mapping of addresses to a home tile id.

In certain implementations, the mapping of a physical address to a home tile id can be stored in an associative structure, such as a home tile table 250. Home tile table 250 can maintain a global mapping of addresses to a home tile id. Such a table can be cached, such as per core, by a cache controller using a data structure such as a home-tile lookaside buffer (HLB) 260. It should be noted that, in certain implementations, the referenced home tile table 250 can be employed by augmenting a page table and/or translation lookaside buffer (TLB) (such as is shown in FIG. 1E), such as with home tile id. It should be noted that, in certain implementations, the home tile mapping maintained by the home tile table 250 can be maintained in the page granularity (that is, a home-tile can be determined on a page-by-page basis), thereby resulting in a relatively smaller table. Moreover, it should be understood that, in various implementations described herein, the granularity of the references mapping(s) should be understood to be page, though in other implementations other granularities can also be employed. Additionally, in certain implementations a dynamic home tile flag 252 can be maintained, and a hash function based approach 254 can be employed when the flag 252 is not set, as described herein.

In a scenario where a particular core requests or otherwise needs to look up the directory, the dynamic home tile flag 252 can first be checked. If the flag is not set, hash-function based techniques 254 (such as those referenced herein) can be used (thus ensuring backward compatibility). If the flag 252 is set, the desired address can be looked up in the HLB 260. When the HLB is hit, coherence messages can be sent to the resultant home tile. Looking up the HLB can be done in parallel with constructing the coherence messages. In embodiments that implement HLB 260 by augmenting TLB with home tile ids (as referenced herein), it should be understood that the home tile id can already be available when the directory is consulted. If the HLB 260 is missed, the home tile table 250 (which can contain all home-tile IDs) can be looked up. It should be understood that each processor core can have its own HLB, and each HLB can contain recently/frequently used addresses/home tile ids. Moreover, while in various implementations each core can be configured to have its own HLB, in other implementations each process can be configured with its own HLB.

In various scenarios, it can be advantageous to migrate one or more home tiles. In certain implementations, such migrations (as described herein) can be employed at page granularity. Moreover, such migrations can be employed, for example, using a structure such as a directory locality table (DLT) 256. Each directory slice can contain a DLT that tracks the pages for which it is the home slice. It should be understood that DLTs are associative structures, where the keys are physical addresses (e.g., the most significant bits).

In one implementation, an entry in the DLT can hold information pertaining to where on a chip (e.g., which one of a plurality of cores) recent accesses to the corresponding page came from. For example, consider a scenario pertaining to information of k recent accesses having an interconnect topology that is a 2D mesh. In such a scenario, the value of each entry can consist of k (x, y) tuples maintained as a circular queue structure. Based on these k tuples, the average and standard deviation of the last k coherence message sender locations (e.g., various cores) can be computed. If the current home tile is sufficiently far from the average sender location (as normalized to the variance), the home tile can be migrated to the computed average location. More precisely, in certain implementations $$\frac{|c_x - \mu_x|}{\sigma_x} + \frac{|c_y - \mu_y|}{\sigma_y}$$

can be computed, where $(\mu_x, \mu_y)$ and $(\sigma_x, \sigma_y)$ denote the average and standard deviation of last k sender locations (e.g., different cores), and $(c_x, c_y)$ denotes the current home tile location. Based on a determination that the referenced computed value exceeds a predefined threshold, $\alpha$, the home tile can be migrated to $(\mu_x, \mu_y)$ rounded to an integer tile id. In this example, a normalized L1 distance is used because the number of hops corresponds to the Manhattan distance. Table 1 shows such an example:

TABLE 1

| Directory Locality Table at Tile (4, 5) | | | | |
|---|---|---|---|---|
| Address | Last 4 Coherence Msg. Sender Locations | | | |
| 0xdeadbeef | (1, 2) | (1, 2) | (2, 3) | (1, 2) |

It can be appreciated, with respect to table 1, that:

$(\mu_x,\mu_y)=(1.25,2.25),(\sigma_x,\sigma_y)=(0.5,0.5),(c_x,c_y)=(4,5)|c_x-\mu_x|/\sigma_x+|c_y-\mu_y|/\sigma_y>\alpha=10$ ➜ migrate to (1,2)

In certain implementations, the referenced Home Tile can be allocated and/or migrated in a manual/user-defined manner. For example, an operating system can provide interfaces through which users can control the home tile id of a page during allocation and/or migrate the home tile of a page to a new one. In one implementation, such an interface can be provided in conjunction with the non-uniform memory access (NUMA) system calls that are present in operating systems like Linux. When the dynamic home tile flag 252 is set, in addition to controlling which memory should hold the page, one or more system calls can also control the associated home tile id. For example, when the NUMA mode is set to allocate pages to a memory closest to the core executing the current thread (i.e., default mode), the home tile of the page can also be mapped to the core executing the current thread. When a page is moved to the new memory by the NUMA migration system calls, the associated home tile can also be moved.

By way of illustration, existing NUMA system calls can be extended by providing the followings commands:

int enable_dynamic_home_tile(int flag); // enable dynamic home tile when flag !=0, disable otherwise.

int enable_automatic_home_tile_migration(int flag); // enable automatic home tile migration by directory locality table when flag !=0, disable otherwise.

It should be understood that the bitmask in numa_migrate_pages is to specify cores in addition to sockets.

It should be noted that the automatic/automated migration techniques described above as well as the manual techniques described herein can be implemented selectively and/or simultaneously. For example, it may be advantageous for certain applications to employ the automatic techniques in light of the attendant portability and relative ease of programming, while for other applications the automatic techniques can be complemented by manually controlling home tiles of a one or more data structures (e.g., important data structures). For certain other applications (e.g., in the high performance computing domain) it may be advantageous to control the home tile entirely by software to maximize the proximity of directory information to its users.

Figure 3:
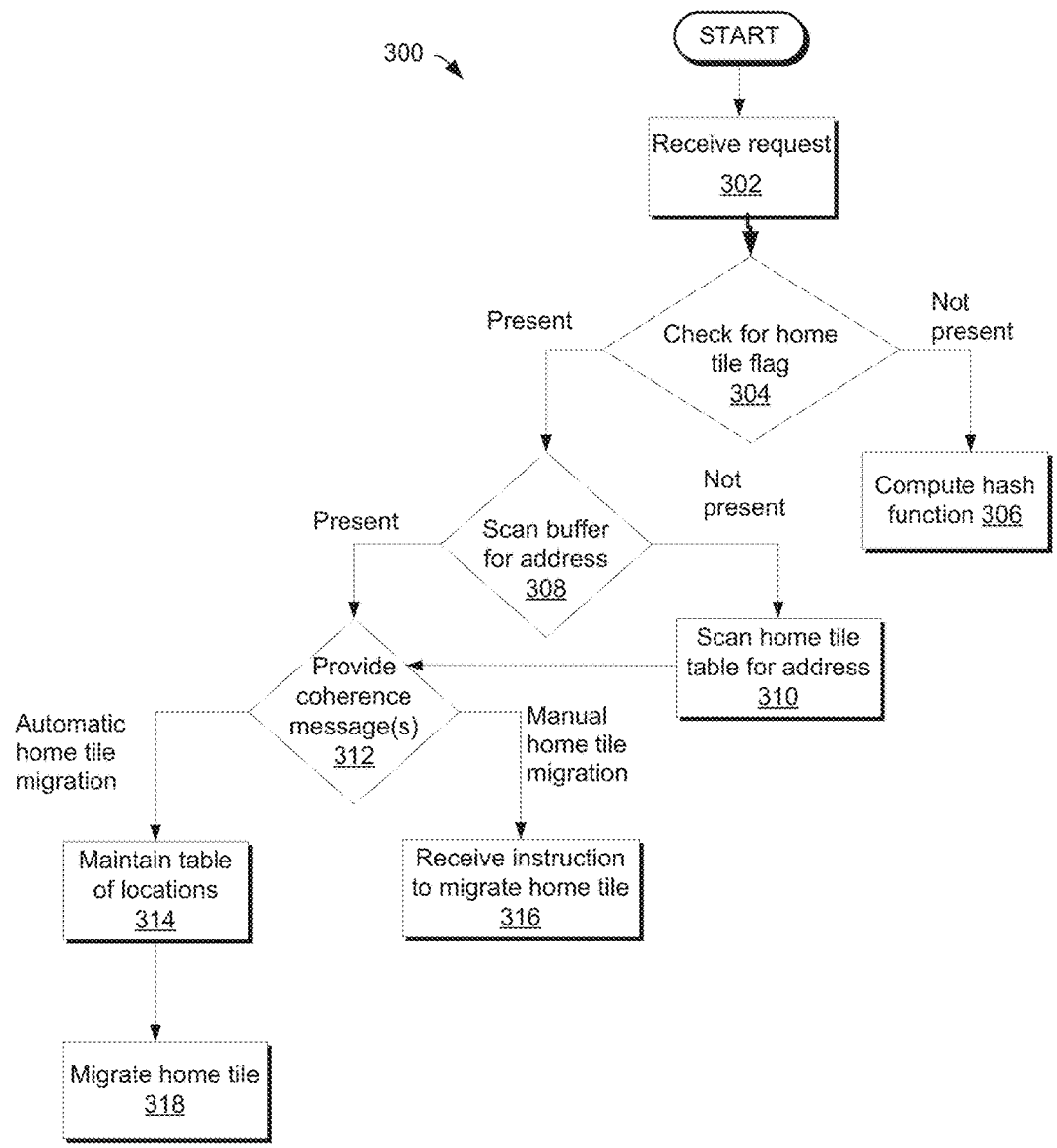
FIG. 3 is a flow diagram illustrating a method for dynamic home tile mapping according to an embodiment.

FIG. 3 is a flow diagram of method 300 for dynamic home tile mapping according to some embodiments. Method 300 may be performed by processing logic that may comprise hardware (e.g., circuitry, dedicated logic, programmable logic, microcode, etc.), software (such as instructions run on a processing device), firmware or a combination thereof.

Referring to FIG. 3, the method 300 begins by the cache controller/HLB receiving an address request from a processing core. In certain implementations, the processing core can be associated with a home tile table that maps directory addresses to home tiles, as described herein (block 302). In response to receipt of the address request, the cache controller/HLB checks for a presence of a home tile flag (304). Based on a determination that the home tile flag is not present, the cache controller/HLB can compute a hash function, as described herein (306). At 308, the cache controller scans the buffer such as the HLB to identify a presence of the address within the buffer. Based on an identification that the address is not present within the buffer, at 310 the home tile table can be scanned to identify a presence of the address within the home tile table. Based on an identification of the presence of the address within the buffer (or within the home tile table), one or more messages, such as coherence messages, can be provided to the home tile corresponding to the address (312). In certain implementations, an instruction to migrate the home tile to another location can be received (316). In other implementations, at 314 a table of locations from which requests of a particular home tile table have been received can be maintained. Based on a determination that one or more distances between the home tile and the locations from which requests of a particular home tile table have been received exceed a defined threshold, the home tile can be migrated to another location (318).

Figure 4:
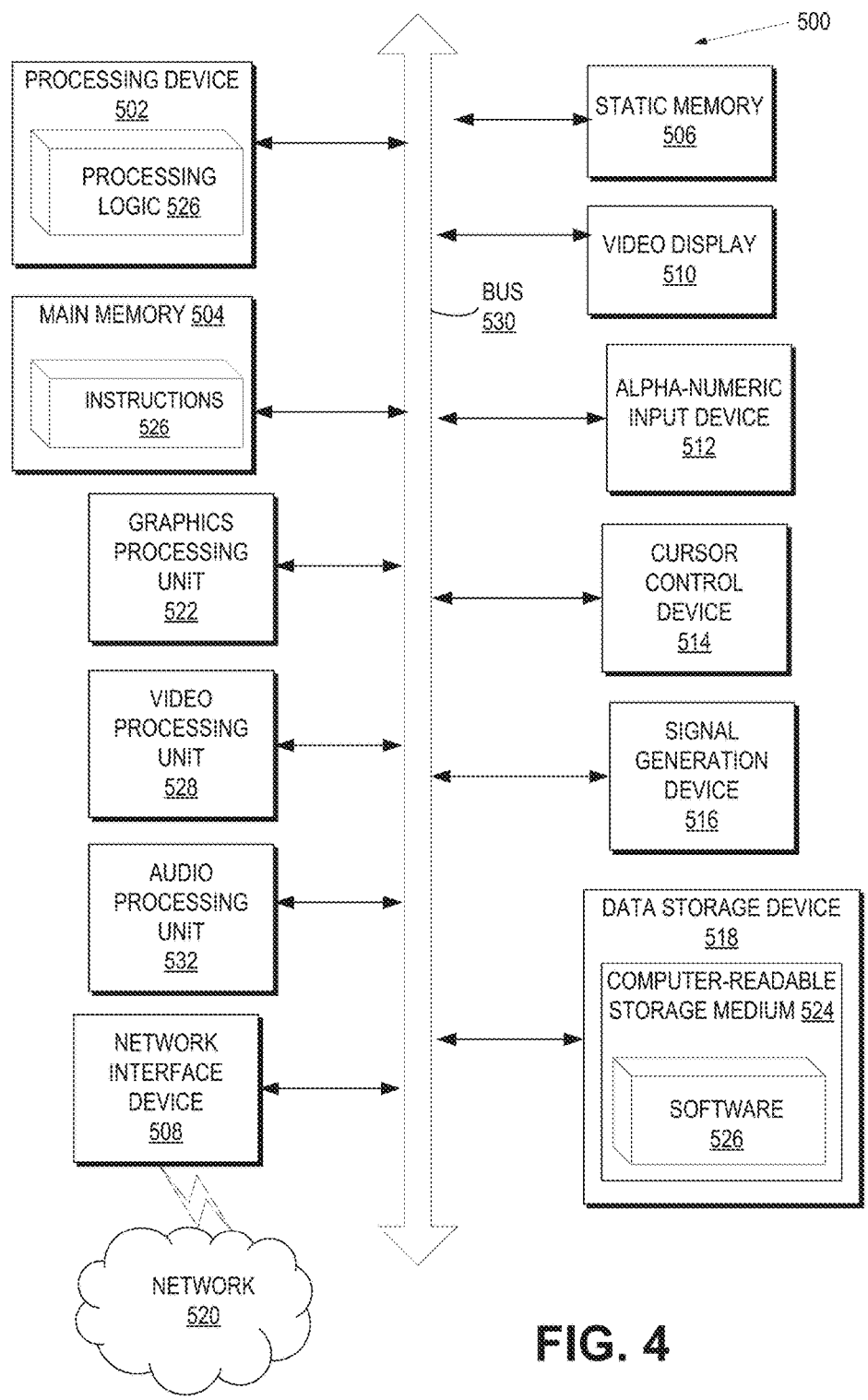
FIG. 4 illustrates a diagrammatic representation of a machine in the example form of a computer system within which a set of instructions, for causing the machine to perform any one or more of the methodologies discussed herein, may be executed.

FIG. 4 illustrates a representation of a machine in the example form of a computer system 500 within which a set of instructions, for causing the machine to perform any one or more of the methodologies discussed herein, such as dynamic home tile mapping, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 500 includes a processing device 502, a main memory 504 (e.g., read-only memory (ROM), flash memory, dynamic random access memory (DRAM) (such as synchronous DRAM (SDRAM) or DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. In one embodiment, processing device 502 may include one or processing cores. The processing device 502 is configured to execute the processing logic 526 for performing the operations discussed herein. In one embodiment, processing device 502 is the same as computing system 100 of FIG. 1A. In another embodiment, processing device 502 is the same as computing system 140 of FIG. 1B. In another embodiment, processing device 502 implements dynamic home tile mapping (not shown).

The computer system 500 may further include a network interface device 508 communicably coupled to a network 520. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), a signal generation device 516 (e.g., a speaker), or other peripheral devices. Furthermore, computer system 500 may include a graphics processing unit 522, a video processing unit 528, and an audio processing unit 532. In another embodiment, the computer system 500 may include a chipset (not illustrated), which refers to a group of integrated circuits, or chips, that are designed to work with the processing device 502 and controls communications between the processing device 502 and external devices. For example, the chipset may be a set of chips on a motherboard that links the processing device 502 to very high-speed devices, such as main memory 504 and graphic controllers, as well as linking the processing device 502 to lower-speed peripheral buses of peripherals, such as USB, PCI or ISA buses.

The data storage device 518 may include a computer-readable storage medium 524 on which is stored software 526 embodying any one or more of the methodologies of functions described herein. The software 526 may also reside, completely or at least partially, within the main memory 504 as instructions 526 and/or within the processing device 502 as processing logic 526 during execution thereof by the computer system 500; the main memory 504 and the processing device 502 also constituting computer-readable storage media.

The computer-readable storage medium 524 may also be used to store instructions 526 for dynamic home tile mapping, such as is described with respect to FIGS. 1A-F and FIG. 2, and/or a software library containing methods that call the above applications. While the computer-readable storage medium 524 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

Figure 5:
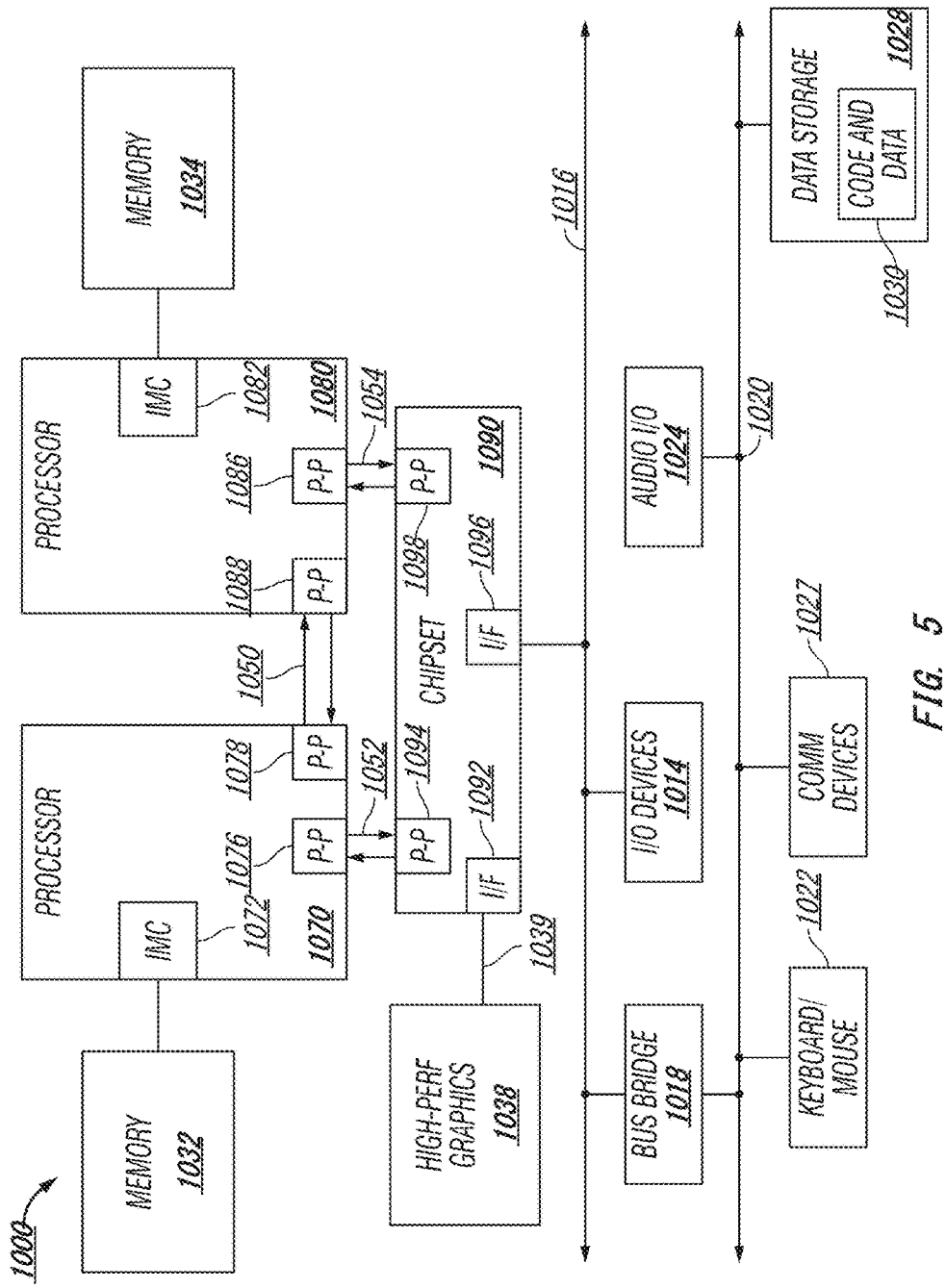
FIG. 5 is a block diagram of a computer system according to one embodiment.

Referring now to FIG. 5, shown is a block diagram of a second system 1000 in accordance with an embodiment of the present disclosure. As shown in FIG. 5, multiprocessor system 1000 is a point-to-point interconnect system, and includes a first processor 1070 and a second processor 1080 coupled via a point-to-point interconnect 1050. Each of processors 1070 and 1080 may be some version of the computing systems described herein, such as systems for dynamic home tile mapping.

While shown with two processors 1070, 1080, it is to be understood that the scope of the present disclosure is not so limited. In other embodiments, one or more additional processors may be present in a given processor.

Processors 1070 and 1080 are shown including integrated memory controller units 1072 and 1082, respectively. Processor 1070 also includes as part of its bus controller units point-to-point (P-P) interfaces 1076 and 1078; similarly, second processor 1080 includes P-P interfaces 1086 and 1088. Processors 1070, 1080 may exchange information via a point-to-point (P-P) interface 1050 using P-P interface circuits 1078, 1088. As shown in FIG. 5, IMCs 1072 and 1082 couple the processors to respective memories, namely a memory 1032 and a memory 1034, which may be portions of main memory locally attached to the respective processors.

Processors 1070, 1080 may each exchange information with a chipset 1090 via individual P-P interfaces 1052, 1054 using point to point interface circuits 1076, 1094, 1086, 1098. Chipset 1090 may also exchange information with a high-performance graphics circuit 1038 via a high-performance graphics interface 1039.

A shared cache (not shown) may be included in either processor or outside of both processors, yet connected with the processors via P-P interconnect, such that either or both processors' local cache information may be stored in the shared cache if a processor is placed into a low power mode.

Chipset 1090 may be coupled to a first bus 1016 via an interface 1096. In one embodiment, first bus 1016 may be a Peripheral Component Interconnect (PCI) bus, or a bus such as a PCI Express bus or another third generation I/O interconnect bus, although the scope of the present disclosure is not so limited.

As shown in FIG. 5, various I/O devices 1014 may be coupled to first bus 1016, along with a bus bridge 1018 which couples first bus 1016 to a second bus 1020. In one embodiment, second bus 1020 may be a low pin count (LPC) bus. Various devices may be coupled to second bus 1020 including, for example, a keyboard and/or mouse 1022, communication devices 1027 and a storage unit 1028 such as a disk drive or other mass storage device which may include instructions/code and data 1030, in one embodiment. Further, an audio I/O 1024 may be coupled to second bus 1020. Note that other architectures are possible. For example, instead of the point-to-point architecture of FIG. 5, a system may implement a multi-drop bus or other such architecture.

Figure 6:
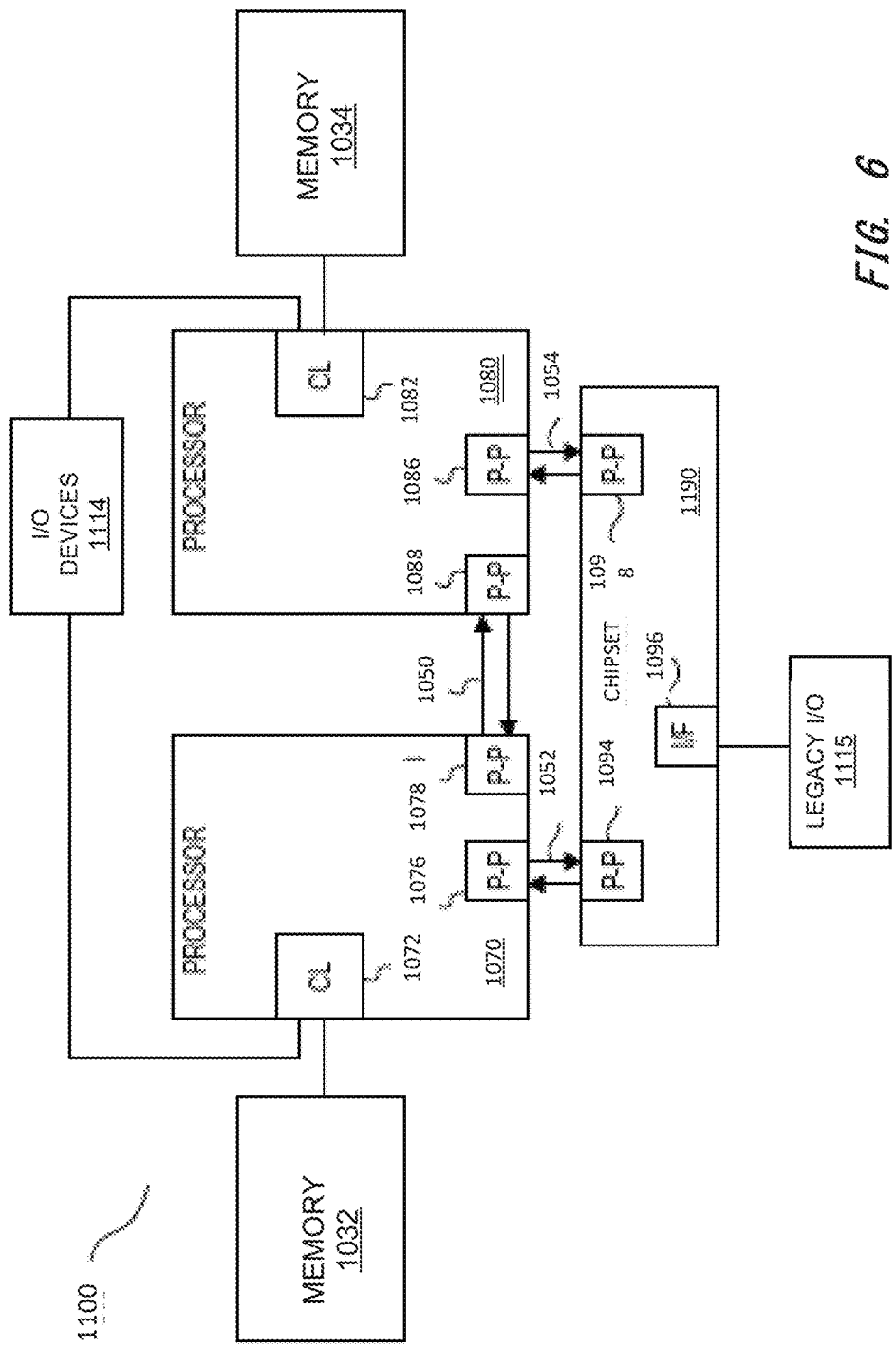
FIG. 6 is a block diagram of a computer system according to one embodiment.

Referring now to FIG. 6, shown is a block diagram of a third system 1100 in accordance with an embodiment of the present disclosure, such as a system for dynamic home tile mapping. Like elements in FIGS. 5 and 6 bear like reference numerals, and certain aspects of FIG. 5 have been omitted from FIG. 6 in order to avoid obscuring other aspects of FIG. 6.

FIG. 6 illustrates that the processors 1170, 1180 may include integrated memory and I/O control logic ("CL") 1172 and 1182, respectively. For at least one embodiment, the CL 1172, 1182 may include integrated memory controller units such as that described above in connection with FIG. 5. In addition. CL 1172, 1182 may also include I/O control logic. FIG. 6 illustrates that the memories 1132, 1134 are coupled to the CL 1172, 1182, and that I/O devices 1114 are also coupled to the control logic 1172, 1182. Legacy I/O devices 1115 are coupled to the chipset 1190.

The following examples pertain to further embodiments.

Example 1 is a processing device for cache control comprising: a home tile table, the home tile table comprising respective mappings of one or more directory addresses to one or more home tiles; and a cache controller, coupled to the home tile table and associated with a processing core, the cache controller comprising a buffer and being configured to: receive an address request from the processing core; scan the buffer to identify a presence of an address within the buffer; and based on an identification of the presence of the address within the buffer, provide, from the buffer, a home tile identifier corresponding to the address.

In Example 2, the cache controller of Example 1 is optionally further configured to: based on an identification that the address is not present within the buffer, scan the home tile table to identify a presence of the address within the home tile table.

In Example 3, the cache controller of Example 1 is optionally further configured to: provide, based on an identification of the presence of the address within the buffer, one or more messages to the home tile corresponding to the address.

In Example 4, the cache controller of Example 1 is optionally further configured to: maintain a table of locations from which requests of a particular home tile table have been received.

In Example 5, the cache controller of Example 4 is optionally further configured to: migrate, based on a determination that one or more distances between the home tile and the locations from which requests of a particular home tile table have been received exceed a defined threshold, the home tile to another location.

In Example 6, the cache controller of Example 5 is optionally further configured to: provide, in response to a migration of the home tile, a migration request to a directory associated with the home tile.

In Example 7, the cache controller of Example 1 is optionally further configured to: receive an instruction to migrate the home tile to another location.

In Example 8, the cache controller of Example 7, wherein the instruction is received in response to a request from a software application.

In Example 9, the cache controller of Example 1 is optionally further configured to: check for a presence of a home tile flag in response to receipt of the address request.

In Example 10, the cache controller of Example 9 is optionally further configured to: compute, based on a determination that the home tile flag is not present, a hash function.

Various embodiments may have different combinations of the operational features described above. For instance, all optional features of the apparatus described above may also be implemented with respect to the method or process described herein and specifics in the examples may be used anywhere in one or more embodiments.

Example 11 is a method comprising: 1) receiving an address request from a processing core, the processing core being associated with a home tile table, the home tile table comprising respective mappings of one or more directory addresses to one or more home tiles; 2) scanning a buffer to identify a presence of an address within the buffer; and 3) based on an identification of the presence of the address within the buffer, providing, from the buffer, a home tile identifier corresponding to the address.

In Example 12, the method of Example 11, further comprising scanning, based on an identification that the address is not present within the buffer, the home tile table to identify a presence of the address within the home tile table.

In Example 13, the method of Example 11, further comprising providing, based on an identification of the presence of the address within the buffer, one or more messages to the home tile corresponding to the address.

In Example 14, the method of Example 11, further comprising maintaining a table of locations from which requests of a particular home tile table have been received.

In Example 15, the method of Example 14, further comprising migrating, based on a determination that one or more distances between the home tile and the locations from which requests of a particular home tile table have been received exceed a defined threshold, the home tile to another location.

In Example 16, the method of Example 15, further comprising providing, in response to the migrating, a migration request to a directory associated with the home tile.

In Example 17, the method of Example 11, further comprising receiving an instruction to migrate the home tile to another location.

In Example 18, the method of Example 17, wherein the instruction is received in response to a request from a software application In Example 19, the method of Example 11, further comprising checking for a presence of a home tile flag in response to receipt of the address request.

In Example 20, the method of Example 19, further comprising computing, based on a determination that the home tile flag is not present, a hash function.

Various embodiments may have different combinations of the operational features described above. For instance, all optional features of the method described above may also be implemented with respect to a non-transitory, computer-readable storage medium. Specifics in the examples may be used anywhere in one or more embodiments.

Example 21 is a non-transitory, computer-readable storage medium including instructions that, when executed by a computing system, cause the computing system to perform operations comprising: receiving an address request from a processing core, the processing core being associated with a home tile table, the home tile table comprising respective mappings of one or more directory addresses to one or more home tiles; scanning a buffer to identify a presence of an address within the buffer; and based on an identification of the presence of the address within the buffer, providing, from the buffer, a home tile identifier corresponding to the address.

In Example 22, the storage medium of Example 21, further comprising instructions that, when executed by a computing system based on an identification that the address is not present within the buffer, cause the computing system to perform operations comprising scanning the home tile table to identify a presence of the address within the home tile table.

In Example 23, the storage medium of Example 21, further comprising instructions that, when executed by a computing system based on an identification of the presence of the address within the buffer, cause the computing system to perform operations comprising providing one or more messages to the home tile corresponding to the address.

In Example 24, the storage medium of Example 21, further comprising instructions that, when executed by a computing system, cause the computing system to perform operations comprising maintaining a table of locations from which requests of a particular home tile table have been received.

In Example 25, the storage medium of Example 24, further comprising instructions that, when executed by a computing system based on a determination that one or more distances between the home tile and the locations from which requests of a particular home tile table have been received exceed a defined threshold, cause the computing system to perform operations comprising migrating the home tile to another location.

In Example 26, the storage medium of Example 25, further comprising instructions that, when executed by a computing system in response to the migrating, cause the computing system to perform operations comprising providing a migration request to a directory associated with the home tile.

In Example 27, the storage medium of Example 21, further comprising instructions that, when executed by a computing system, cause the computing system to perform operations comprising receiving an instruction to migrate the home tile to another location.

In Example 28, the storage medium of Example 27, wherein the instruction is received in response to a request from a software application In Example 29, the storage medium of Example 21, further comprising instructions that, when executed by a computing system in response to receipt of the address request, cause the computing system to perform operations comprising checking for a presence of a home tile flag.

In Example 30, the storage medium of Example 29, further comprising instructions that, when executed by a computing system based on a determination that the home tile flag is not present, cause the computing system to perform operations comprising computing a hash function.

Example 31 is a system comprising: a processor, the processor comprising: a home tile table, the home tile table comprising respective mappings of one or more directory addresses to one or more home tiles; and a cache controller, coupled to the home tile table and associated with a processing core, the cache controller comprising a buffer and being configured to: receive an address request from the processing core; scan the buffer to identify a presence of an address within the buffer; and based on an identification of the presence of the address within the buffer, provide, from the buffer, a home tile identifier corresponding to the address.

In Example 32, the system of Example 31, wherein based on an identification that the address is not present within the buffer, the cache controller is configured to scan the home tile table to identify a presence of the address within the home tile table.

In Example 33, the system of Example 31, wherein the cache controller is further configured to provide, based on an identification of the presence of the address within the buffer, one or more messages to the home tile corresponding to the address.

In Example 34, the system of Example 31, wherein the cache controller is further configured to maintain a table of locations from which requests of a particular home tile table have been received.

In Example 35, the system of Example 34, wherein the cache controller is further configured to migrate, based on a determination that one or more distances between the home tile and the locations from which requests of a particular home tile table have been received exceed a defined threshold, the home tile to another location.

In Example 36, the system of Example 35, wherein the cache controller is further configured to provide, in response to a migration of the home tile, a migration request to a directory associated with the home tile.

In Example 37, the system of Example 31, wherein the cache controller is further configured to receive an instruction to migrate the home tile to another location.

In Example 38, the system of Example 37, wherein the instruction is received in response to a request from a software application.

In Example 39, the system of Example 31, wherein the cache controller is further configured to check for a presence of a home tile flag in response to receipt of the address request.

In Example 40, the system of Example 39, wherein the cache controller is further configured to compute, based on a determination that the home tile flag is not present, a hash function.

Example 41 is an apparatus comprising: means for receiving an address request from a processing core, the processing core being associated with a home tile table, the home tile table comprising respective mappings of one or more directory addresses to one or more home tiles; means for scanning a buffer to identify a presence of an address within the buffer; and means for providing from the buffer, based on an identification of the presence of the address within the buffer, a home tile identifier corresponding to the address.

In Example 42, the apparatus of Example 41, further comprising means for scanning, based on an identification that the address is not present within the buffer, the home tile table to identify a presence of the address within the home tile table.

In Example 43, the apparatus of Example 41, further comprising means for providing, based on an identification of the presence of the address within the buffer, one or more messages to the home tile corresponding to the address.

In Example 44, the apparatus of Example 41, further comprising means for maintaining a table of locations from which requests of a particular home tile table have been received.

In Example 45, the apparatus of Example 44, further comprising means for migrating, based on a determination that one or more distances between the home tile and the locations from which requests of a particular home tile table have been received exceed a defined threshold, the home tile to another location.

In Example 46, the apparatus of Example 45, further comprising means for providing, in response to the migrating, a migration request to a directory associated with the home tile.

In Example 47, the apparatus of Example 41, further comprising means for receiving an instruction to migrate the home tile to another location.

In Example 48, the apparatus of Example 47, wherein the instruction is received in response to a request from a software application In Example 49, the apparatus of Example 41, further comprising means for checking for a presence of a home tile flag in response to receipt of the address request.

In Example 50, the apparatus of Example 49, further comprising means for computing, based on a determination that the home tile flag is not present, a hash function.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "configuring," "initiating," "requesting," "generating," "accessing," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store the one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the operations. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments. It will be apparent to one skilled in the art, however, that at least some embodiments may be practiced without these specific details. In other instances, well-known components or methods are not described in detail or are presented in simple block diagram format in order to avoid unnecessarily obscuring the present embodiments. Thus, the specific details set forth above are merely exemplary. Particular implementations may vary from these exemplary details and still be contemplated to be within the scope of the present embodiments.

It is to be understood that the above description is intended to be illustrative and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A processor comprising:
  a home tile table, the home tile table comprising a plurality of mappings, each mapping comprising a mapping between a directory address and a home tile, the home tile storing sharing information to maintain cache coherence within a die; and
  a cache controller, coupled to the home tile table and associated with a processor core of a plurality of processor cores on the die, the cache controller to:
    receive coherence messages from other ones of the plurality of processor cores;
    record locations from which the coherence messages originate;
    determine distances between requested home tiles and the locations from which the coherence messages originate;
    determine an average distance for a particular home tile from the distances between the particular home tile and the locations from which corresponding ones of the coherence messages originate;

determine whether the average distance for the particular home tile, whose identifier is stored in the home tile table, exceeds a defined threshold; and migrate the particular home tile to another location when the average distance between the particular home tile exceeds the defined threshold.

2. The processor of claim 1, further comprising a directory locality table to the locations from which the coherence messages originate.

3. The processor of claim 2, wherein the cache controller is to calculate the average and a standard deviation of the locations of a predetermined number of the coherence messages, and store the average and standard deviation in an entry of the directory locality table.

4. The processor of claim 2, wherein the cache controller is to calculate the average and a standard deviation of the locations of a predetermined number, k, of the coherence messages, and store the average and standard deviation in an entry of the directory locality table.

5. The processor of claim 3, wherein the locations of the predetermined number of the coherence messages are stored as k tuples maintained as a circular queue structure, wherein k is a positive integer.

6. The processor of claim 1, wherein the cache controller comprises a buffer, and wherein the cache controller is to:
receive an address request from the processor core;
scan the buffer to identify a presence of an address within the buffer; and
based on an identification of the presence of the address within the buffer, provide, from the buffer, a home tile identifier corresponding to the address.

7. The processor of claim 6, wherein the cache controller is further to send, based on an identification of the presence of the address within the buffer, a coherence message to the home tile corresponding to the address.

8. The processor of claim 6, wherein the cache controller is further to check for a presence of a home tile flag in response to receipt of the address request.

9. The processor of claim 8, wherein the cache controller is further to compute, based on a determination that the home tile flag is not present, a hash function.

10. The processor of claim 1, wherein the cache controller comprises a buffer, and wherein the cache controller is to:
receive an address request from the processor core;
scan the buffer to identify a presence of an address within the buffer;
in response to an identification that the address is present within the buffer, provide, from the buffer, a home tile identifier corresponding to the address, wherein the home tile identifier corresponds to a home tile that stores sharing information pertaining to data in a cache line corresponding to the address;
in response to an identification that the address is not present within the buffer, scan the home tile table to identify a presence of the address within the home tile table; and
in response to an identification of the presence of the address within the home tile table, provide, from the home tile table, the home tile identifier corresponding to the address.

11. The processor of claim 10, wherein the cache controller is further to send, in response to the identification of the presence of the address within the buffer, one or more messages to the home tile corresponding to the address.

12. The processor of claim 1, wherein the cache controller is further to send, in response to a migration of the home tile, a migration request to a directory associated with the home tile.

13. The processor of claim 1, wherein the cache controller is further to receive an instruction to migrate the home tile to another location.

14. The processor of claim 13, wherein the instruction is received in response to a request from a software application.

15. A method comprising:
receiving, at a cache controller associated with a processor core of a plurality of processor cores on a die, coherence messages from other ones of the plurality of processor cores on the die, the processor core being associated with a home tile table, the home tile comprising a plurality of mappings, each mapping comprising a mapping between a directory address and a home tile, the home tile storing sharing information to maintain cache coherence within the die;
recording locations from which the coherence messages originate;
determining distances between requested home tiles and the locations from which the coherence messages originate;
determining an average distance for a particular home tile from the distances between the particular home tile and the locations from which corresponding ones of the coherence messages originate;
determining whether the average distance for the particular home tile, whose identifier is stored in the home tile table, exceeds a defined threshold; and
migrating the particular home tile to another location when the average distance between the particular home tile exceeds the defined threshold.

16. The method of claim 15, further comprising:
receiving an address request from the processor core;
scanning a buffer to identify a presence of an address within the buffer; and
based on an identification of the presence of the address within the buffer, providing, from the buffer, a home tile identifier corresponding to the address.

17. The method of claim 16, further comprising:
scanning, based on an identification that the address is not present within the buffer, the home tile table to identify a presence of the address within the home tile table; and
providing, based on an identification of the presence of the address within the buffer, one or more messages to the home tile corresponding to the address.

18. The method of claim 15, further comprising providing, in response to the migrating, a migration request to a directory associated with the home tile.

19. A system comprising:
a memory device; and
an integrated circuit die coupled to the memory device, the integrated circuit die comprising:
a plurality of cores;
a plurality of caches;
a home tile table, the home tile table comprising a plurality of mappings, each mapping comprising a mapping between a directory address and a home tile, the home tile storing sharing information to maintain cache coherence within the plurality of caches of the integrated circuit die; and
a cache controller, coupled to the home tile table and associated with a core of the plurality of cores, the cache controller to:

receive coherence messages from other ones of the plurality of cores;

record locations from which the coherence messages originate;

determine distances between requested home tiles and the locations from which the coherence messages originate;

determine an average distance for a particular home tile from the distances between the particular home tile and the locations from which corresponding ones of the coherence messages originate;

determine whether the average distance for the particular home tile, whose identifier is stored in the home tile table, exceeds a defined threshold; and migrate the particular home tile to another location when the average distance between the particular home tile exceeds the defined threshold.

20. The system of claim 19, further comprising:

a memory controller;

a bus controller; and graphics circuitry.

\* \* \* \* \*